US006052458A

United States Patent [19]
Amir-Ebrahimi

[11] Patent Number: 6,052,458
[45] Date of Patent: Apr. 18, 2000

[54] METHOD FOR MESSAGE MARKING AND DETECTION OF MESSAGE LOOPING AMONG SIGNALING NETWORKS IN A TELECOMMUNICATIONS SYSTEM

[75] Inventor: Kamran Amir-Ebrahimi, Riverside, Ill.

[73] Assignee: Lucent Technologies Inc., Murray Hill, N.J.

[21] Appl. No.: 08/837,133

[22] Filed: Apr. 14, 1997

Related U.S. Application Data

[63] Continuation-in-part of application No. 08/755,515, Nov. 22, 1996, abandoned.

[51] Int. Cl.[7] .............................. H04M 3/42; H04M 7/00

[52] U.S. Cl. ...................... 379/229; 379/207; 379/211; 379/220; 379/230

[58] Field of Search ...................... 379/211, 207, 379/229, 230, 212, 221, 201, 220

[56] References Cited

U.S. PATENT DOCUMENTS

| 5,018,194 | 5/1991 | Suziki et al. | 379/207 |
|---|---|---|---|
| 5,282,244 | 1/1994 | Fuller et al. | 379/230 |
| 5,430,719 | 7/1995 | Weisser, Jr. | 370/58.2 |
| 5,442,689 | 8/1995 | Buttitta et al. | 379/201 |
| 5,481,603 | 1/1996 | Gutierrez et al. | 379/221 |
| 5,566,235 | 10/1996 | Hetz | 379/201 |
| 5,572,579 | 11/1996 | Orriss et al. | 379/142 |
| 5,625,681 | 4/1997 | Butler, II | 379/207 |
| 5,717,750 | 2/1998 | Adams, Jr. et al. | 379/213 |
| 5,754,790 | 5/1998 | France et al. | 395/200.68 |
| 5,917,901 | 6/1999 | Maxwell et al. | 379/229 |

Primary Examiner—Fan S. Tsang
Assistant Examiner—Allan Hoosain
Attorney, Agent, or Firm—Mony R. Ghose

[57] ABSTRACT

A method for prohibiting the continual routing of signaling messages among independent signaling networks requires including signature data in a called party identification field of each signaling message. Subsequent receipt of a signaling message in which the signature data in the called party identification field is recognized as being indigenous to the signaling network results in discarding the signaling message.

13 Claims, 2 Drawing Sheets

METHOD FOR MESSAGE MARKING AND DETECTION OF MESSAGE LOOPING AMONG SIGNALING NETWORKS IN A TELECOMMUNICATIONS SYSTEM

This application is a continuation-in-part of application Ser. No. 08/755,515, filed on Nov. 22, 1996, abandoned.

FIELD OF THE INVENTION

This invention relates to telecommunications networks, and more particularly, to managing translation data error in such telecommunications networks.

BACKGROUND OF THE INVENTION

The United States telecommunications industry is in a state of transition. During the next several years, it is expected that the monopoly held by local exchange carriers will be substantially altered and competitive access providers will begin to offer customer service for both toll and local exchange calls. To facilitate this transition without creating an excessive burden on subscribers of competitive access providers, a requirement for service provider number portability is anticipated. Service provider number portability is defined as a change in service provider without a change in directory number. Eventually, location number portability will also be available so that customers can move to other geographic locations without a change in directory number.

Number portability, regardless of type, significantly impacts call routing in the existing telecommunications network. This is because calls between telephone customers in the United States are established on the basis of a national directory number plan, wherein each customer line is identified by a ten-digit directory number having geographic and central office switch significance. The ten-digit directory number comprises a three-digit area code (generally denoted by the letters "NPA") defining a specific geographic region followed by a three-digit office code (denoted by the letters "NXX") identifying a particular central office switch in the network. The remaining four digits are customer line identifiers (denoted by the letters "XXXX") for establishing the line address of a particular customer line served by the central office switch identified by the NXX digits. Customers who change service providers while retaining their directory number are typically served by a central office switch which normally serves NPA-NXX digits different than the NPA-NXX digits of the customer's directory number. In other words, such customers "port" their directory numbers.

Ported directory numbers require special accommodation in existing telecommunications networks. More particularly, accommodation is required whenever a customer's directory number is used as the basis for determining whether service is provided. For example, validation of calling card service requires a provider to access a line identification data base (that is, a data base indexed by directory number) to verify the validity of a directory number-based calling card. Each calling card service provider maintains a separate line identification data base which is accessed via a signaling network serving the calling card service provider.

To accommodate those ported directory number customers who maintain directory number-based calling cards, local number portability-global title translation (hereinafter, "LNP-GTT") systems are used to obtain translation data allowing signaling networks to route calling card validation requests to an appropriate calling card service provider. Currently, an originating switch (that is, a switch receiving a request to place a directory number-based calling card call) accesses its LNP-GTT to obtain calling card validation routing information. If the LNP-GTT system recognizes the calling card number as being associated with a ported directory number, the request for validation is extended by the "originating" LNP-GTT system to a gateway node of the network of the alternate service provider.

A significant problem arises, however, if there is translation data error in the originating (or any) LNP-GTT system. This is because the existence of erroneous translation data may initiate an endless routing loop of validation requests among signaling networks causing delays due to the occupation of inter-network signaling links. Currently, there is no means for prohibiting message looping among signaling networks due to translation data error. Further, there is no efficient means for determining the impact on network resources due to translation data error. Therefore, there is a need in the art for efficiently managing and minimizing the adverse effects of translation data error present in telecommunications networks.

SUMMARY OF THE INVENTION

This need is addressed and a technological advance is achieved in the telecommunications art by including unique signature data in each signaling message extended by a first signaling network to a second signaling network. Subsequent receipt of the message and recognition of the signature data contained therein by the first signaling network results in discarding the signaling message without further routing.

In an illustrative embodiment, a directory number-based calling card call is originated by a customer who maintains a ported directory number. A switch serving the ported directory number customer accesses its LNP-GTT system (hereinafter, the "originating" LNP-GTT system) which determines that the validation request is to be handled by an alternate service provider. Accordingly, the originating LNP-GTT system enters unique signature data in a portion of a calling card validation signaling message and extends the signaling message to the alternate service provider identified by the translation data. If the alternate service provider's network returns the calling card validation request to the originating LNP-GTT system, the originating LNP-GTT system recognizes its own signature data and the message is discarded so that no further messages relating to this request are routed. Advantageously, the continual routing of calling card validation signaling messages does not occur and signaling link resources interconnecting independent signaling networks are efficiently used.

DETAILED DESCRIPTION

Figure 1:
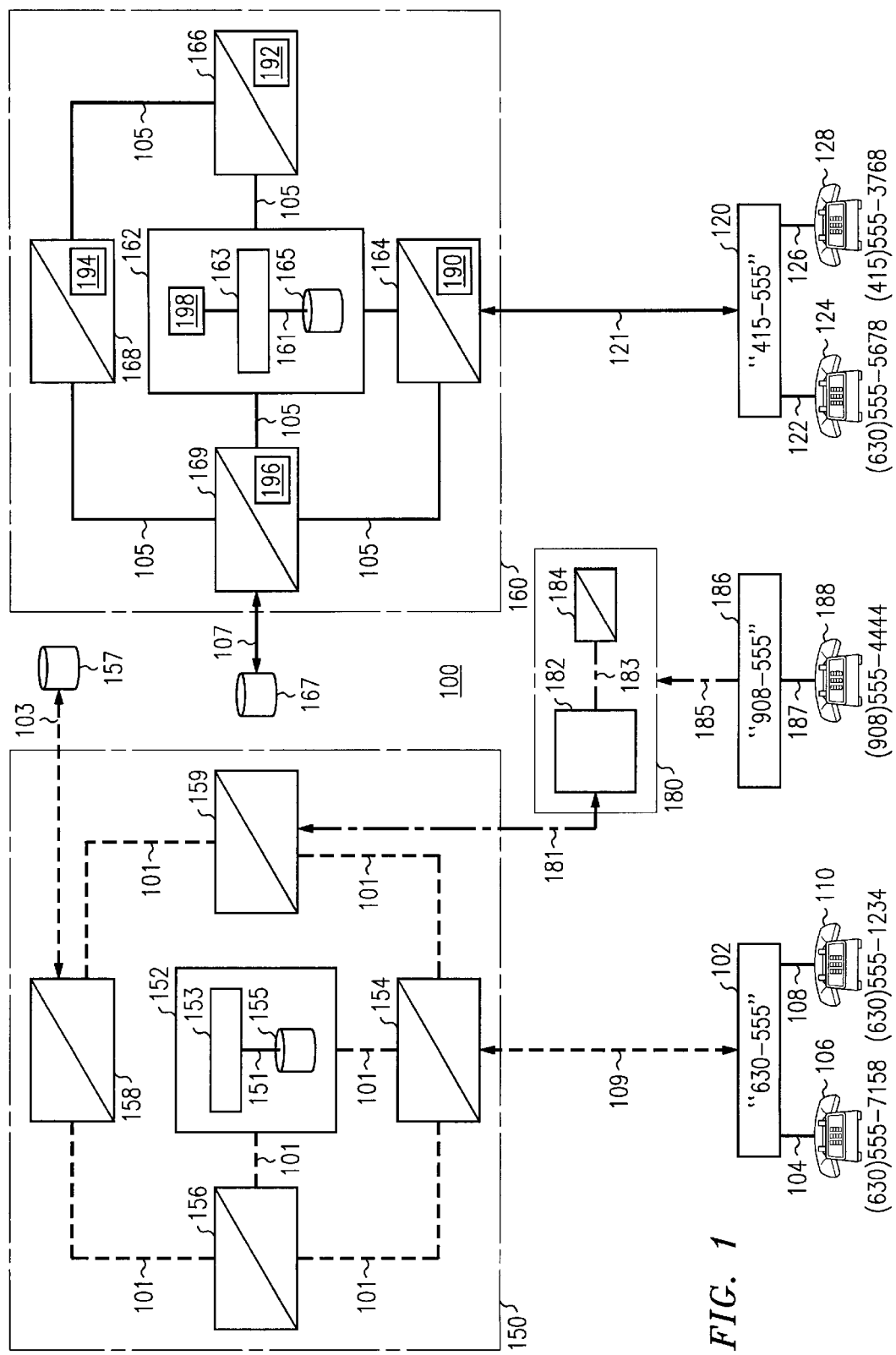
FIG. 1 is a simplified block diagram of a portion of the public-switched telephone network in which the present invention may be practiced.

FIG. 1 shows telecommunications system 100 including telecommunications switches maintained by independent telecommunications service providers. Also shown is a plurality of signaling networks serving the switches associated with each telecommunications service provider. Telecommunications system 100 is a portion of a greater public-switched telephone network (PSTN) which accommodates number portability. In this example, assume that NPA-NXX digits are "owned" by telecommunications service providers but directory numbers can be ported to other telecommunications service providers regardless of the NPA-NXX digits contained therein.

Central office switch 102 serves NPA-NXX digits "630-555" and is owned by a first telecommunications service provider which also owns signaling network 150. In the preferred embodiment, central office switch 102 is the 5ESS® switch manufactured and sold by Lucent Technologies. The switch 102 serves customer line 104 interconnected to telephone 106 identified by directory number "630-555-7158". Central office switch 102 also serves customer line 108 interconnected to telephone 110 which is identified by directory number "630-555-1234". For call connections requiring routing information, validation, or supplemental data relating to directory numbers with NPA-NXX digits "630-555", central office switch 102 access signaling network 150 via signaling link 109.

The first telecommunications service provider's signaling network 150 comprises LNP-GTT system 152, a plurality of signal transfer points 154, 156, 158, 159, and line identification data base (LIDB) 157. LNP-GTT system 152 is interconnected to signal transfer points 154, 156, 158, 159 via signaling links 101 while signaling link 103 is used to retrieve information from LIDB 157. Signal transfer point 159 is a "gateway" point for signaling messages sent to, and received from, other signaling networks such as signaling networks 160 or 180. In this embodiment, LNP-GTT system 152 includes central processing unit 153 interconnected to data base 155 via datalink 151.

As known in the art, the LNP-GTT system includes translation data for all ported directory numbers which require routing to an appropriate alternate provider. More particularly, the translation data is indexed by 10 digit directory number and contains information identifying a gateway signal transfer point of the signaling network associated with the telecommunications service provider to which the directory number has been ported. In the preferred embodiment, LNP-GTT system 152 also formulates signaling messages including signature data identifying signaling network 150.

LIDB 157 stores calling card validation data for all directory number-based calling cards served by the first telecommunications service provider. If it is determined that a call origination attempt relates to a directory number-based calling card served by the first telecommunications service provider, validation information is retrieved from LIDB 157 via one of the signal transfer points.

Central office switch 120 is identified by NPA-NXX digits "415-555" and is owned by a second telecommunications service provider. The second telecommunications service provider also maintains signaling network 160 which is interconnected to central office switch 120 via signaling link 121. In this embodiment, central office switch 120 serves customer line 122 interconnected to telephone 124 identified by directory number "630-555-5678". It is readily apparent that telephone 124 is identified by a "ported" directory number because the NPA-NXX digits "630-555" are normally associated with the first telecommunications service provider. Customer line 126 is interconnected to telephone 128 identified by directory number "415-555-3768". Although not shown in this embodiment, those skilled in the art will recognize that all switches in PSTN 100 may be interconnected via trunk connections.

The second telecommunications service provider's signaling network 160 comprises LNP-GTT system 162, signal transfer points 164, 166, 168, 169 and LIDB 167. Signal transfer point 169 serves as a gateway point for signaling messages relayed to, and received from, other signaling networks. LNP-GTT system 162 and signal transfer points 164, 166, 168, and 169 are interconnected via signaling links 105. LIDB 167 is accessed by the signal transfer points via link 107. LNP-GTT system 162 comprises central processing unit 163 for formulating and entering signature data in each message extended to another signaling network. Processor 198 is used to modify counter bits as described below. Data links 161 interconnect all internal components of LNP-GTT system 162. LNP-GTT system 162 also stores translation data for all ported directory numbers in the PSTN. In this embodiment, translation data for ported directory numbers served by alternate providers comprises routing data to a gateway point of the alternate service provider's signaling network.

In the preferred embodiment, each node in signaling network 160 (that is, signal transfer points 164, 166, 168, 169 and LNP-GTT system 162) is equipped with a processor for recognizing signature data in a signaling message and modifying counter bits contained therein. More particularly, signal transfer points 164, 166, 168, 169 and LNP-GTT system 162 are equipped with processors 190, 192, 194, 196 and 198, respectively, for recognizing signature data and modifying a counter bit. A signaling message initially received in gateway signal transfer point 169 is scanned by processor 196 for signature data identifying signaling network 160. If signaling network 160 signature data is found, a counter bit in the signature data field of the signaling message is modified (that is, the bit is incremented or decremented) by processor 196. Each subsequent node in network 160 which receives the signaling message also modifies the counter bit. In the preferred embodiment, the counter bits are also used to restrict looping of signaling messages. More particularly, each processor may be initialized with a "counter threshold". If any given node within signaling network 160 determines the count for any one particular message has exceeded the predetermined threshold, the node "discards" the message halting further routing. In some embodiments, the node may generate a report of the discarded message which can be used by network management personnel to troubleshoot potential malfunctions relating to the processing of signaling messages.

Signaling network 180 is maintained by a third telecommunications service provider and is interconnected to central office switch 186 via signaling link 185. Similar to the signaling networks described above, signaling network 180 comprises LNP-GTT system 182 for processing signaling messages and formulating signature data in signaling messages. LNP-GTT system 182 is interconnected to signal transfer point 184 via datalink 183. The third telecommunications service provider maintains central office switch 186 which serves customer line 187 terminating at telephone 188 identified by directory number "908-555-4444". In other words, the third telecommunications service provider "owns" the NPA-NXX digits "908-555". In this embodiment, there is an established signaling link (i.e., signaling link 181) interconnecting signal transfer point 184 to gateway signal transfer point 159 of signaling network 150. In the embodiment shown, all LNP-GTT systems in telecommunications 100 are equipped with the capability to enter signature data in signaling messages. In alternative embodiments, all LNP-GTT systems in a telecommunications system may not have this capability.

Currently, a request for calling card validation is automatically routed to a signaling network of the telecommunications service provider which owns the NPA-NXX digits found in the directory number-based calling card number. For example, a request for validation of a calling card incorporating ported directory number "630-555-5678" is routed to signaling network 150 because the NPA-NXX digits "630-555" are associated with the first telecommunications service provider. However, the directory number "630-555-5678" has been ported to the second telecommunications service provider so that the calling card validation data is stored in LIDB 167. If accurate translation data has been entered in LNP-GTT system 152 of signaling network 150, validation requests initially received in signaling network 150 are routed to gateway signal transfer point 169 of signaling network 160 for validation by the second telecommunications service provider. If translation data error is present in LNP-GTT system 152, calling card validation requests may be routed to another signaling network, such as signaling network 180 maintained by the third telecommunications service provider. Unfortunately, in the current system, a calling card validation request received in signaling network 180 will be recognized by LNP-GTT system 182 as belonging to the first telecommunications service provider (due to the NPA-NXX "630-555" being associated with the first telecommunications services provider). Accordingly the calling card validation request will routed by signaling network 180 back to signaling network 150. The result (in the second scenario) is a continual message loop between signaling networks 150 and 180.

In accordance with the preferred embodiment, the message initially extended by signaling network 150 includes signature data unique to network 150. Subsequent receipt of the message in signaling network 150 causes the routing process to be halted as described below.

Figure 2A:
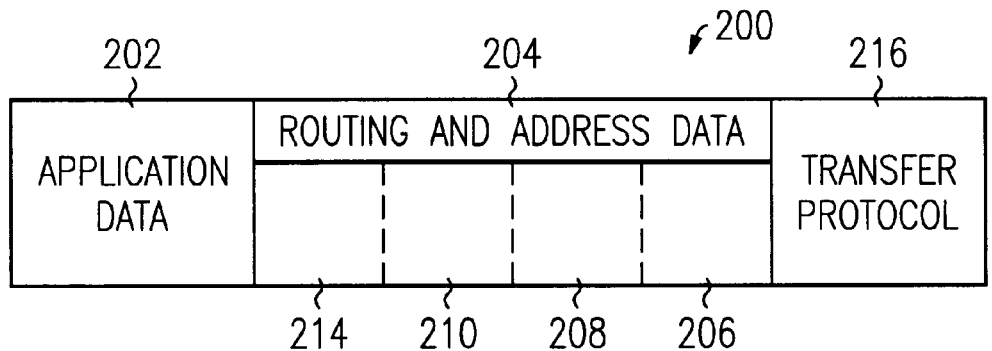
FIGS. 2A and 2B are schematic diagrams of signaling messages in accordance with a preferred embodiment of the present invention.
Figure 2B:
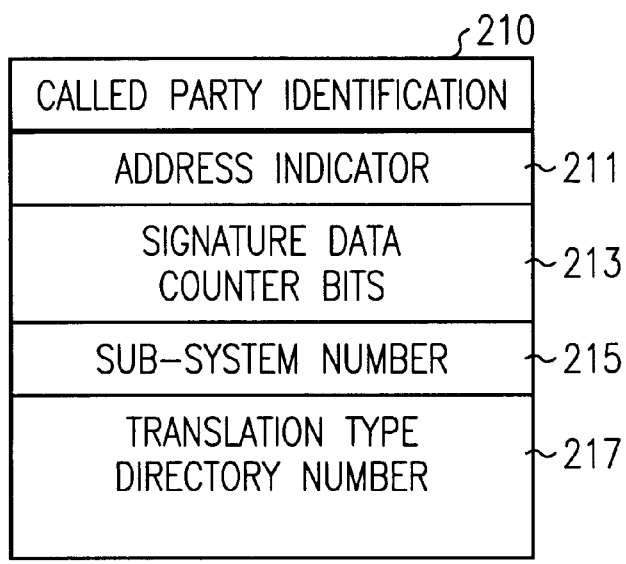

FIGS. 2A and 2B are schematic representations of signaling messages transferred among signaling networks. In this example, FIG. 2A represents a transaction control application part (TCAP) message but other types of signaling messages may also be used. Message 200 comprises three primary components: application data; routing and address data; and transfer protocols. In this example, application data segment 202 of TCAP message 200 includes data regarding the type of service requested (that is, validation of a directory number-based calling card). Data segment 204 includes routing and address data related to the call associated with the message. Routing and address data segment 204 comprises a plurality of sub-segments in which specific information is stored. More particularly, sub-segment 206 comprises routing data for message 200 and sub-segment 208 includes signaling connection data. Sub-segment 210 comprises signature data and the called party identification. Sub-segment 214 comprises the calling party identification (that is, the directory number of the telephone originating the call). Transfer protocol segment 216 includes information relating to the signaling protocol which must be used to extend message 200. In the preferred embodiment, data segment 204 also includes signature data unique to the signaling network handling the message.

FIG. 2B is a more detailed schematic view of sub-segment 210 of data segment 204. Subsection 210 traditionally includes only called party identification data (that is, the directory number identifying the requested end party). In the preferred embodiment, sub-segment 210 also comprises a plurality of fields in which information relating to the call is stored. More particularly, field 211 includes an address indicator for the called party specifying the type of address information present in the message. For message 200, field 211 includes: (a) a routing indicator indicating that the message is being routed via a gateway signal transfer point which is a "non-final" destination (that is, additional routing is required to satisfy the request contained in the message); (b) a global title indicator indicating the address field in the called party address includes a global title; (c) a sub-system number indicator indicating that the address field in the called party address includes a sub-system number field consistent with the routing indicator indication; and (d) a network signature indicator indicating that the address field in the called party address includes a field denoting a signature affixed by service providers. Field 213 comprises unique signature data identifying the signaling networks which have handled the message. In alternative embodiments, only the service provider which created the original message is identified in the signature data field.

In some embodiments, field 213 may include counter bits which are modified each time the message passes through a node in a signaling network which is identified by the signature data as described with respect to the nodes in signaling network 160. Field 215 includes a subsystem number field. Field 217 includes a global title translation type and a directory number of the celled party to which the message pertains. In the preferred embodiment, signature data is created each time the message enters an LNP-GTT system maintained by a new service provider.

The principles of the preferred embodiment of the present invention are illustrated in an example in which calling card validation is requested. Those skilled in the art will recognize, however, that numerous other embodiments may be devised. For purposes of the example, assume a party using telephone 188 served by central office switch 186 wishes to place a calling card call. Also assume that this party maintains a calling card account based on ported directory number "630-555-5678" and is a subscriber of the second telecommunications service provider. The party at telephone 188 originates a call and enters a calling card number as is known in the art. Central office switch 186 receives the call origination information and extends a calling card validation request to signaling network 180 over signaling link 185.

The request for calling card validation is received in LNP-GTT system 182 which recognizes NPA-NXX digits "630-555" of the calling card number as belonging to the first telecommunications service provider (that is, the telecommunications service provider which maintains signaling network 150). Accordingly, a calling card validation request message, such as message 200, is extended from signaling network 180 to gateway signal transfer point 159 of signaling network 150 over signaling link 181. In accordance with the preferred embodiment, LNP-GTT system 182 includes signature data identifying signaling network 180 in field 213 of message 200. The calling card validation request is received in LNP-GTT system 152 of signaling network 150.

In a first scenario, translation data stored in LNP-GTT system 152 recognizes the directory number based calling card associated with ported directory number "630-555-5678" as being served by the second telecommunications service provider (that is, the telecommunications service provider which maintains signaling network 160). Accordingly, signaling network 150 also enters its signature data in field 213 and extends the calling-card validation request message to gateway signal transfer point 169 of signaling network 160 over signaling link 171. Once the calling card validation request is received in signaling network 160, the message is extended to LNP-GTT system 162 which processes the message.

In a second scenario, translation data stored in LNP-GTT system 152 is erroneous. Therefore, LNP-GTT system 152 does not recognize the directory number based calling card associated with ported directory number "630-555-5678" as being served by the second telecommunications service provider. Instead, assume that the translation data stored in LNP-GTT system 152 indicates that the third telecommunications service provider (that is, the telecommunications service provider which maintains signaling network 180) is associated with this calling card. Accordingly, LNP-GTT system 152 enters signature data in field 213 of message 200 and returns the calling card validation request message to signaling network 180 over signaling link 181. The returned calling card validation request message is received in gateway signal transfer point 184 which extends the message to LNP-GTT system 182 over signaling link 183. In accordance with the preferred embodiment, LNP-GTT system 182 recognizes its own signature data in field 213 of message 200, and discards the message to prohibit further routing of this calling card validation request. As a result, the continual routing of the calling card validation request message among the signaling networks is prohibited.

In the illustrative embodiment described above, each signaling network entered its own signature data in field 213 of message 200. Although in the preferred embodiment field 213 can accommodate signature data from multiple signaling networks, those skilled in the art will recognize that there are known limitations to the amount of signature data which may be stored in any one field. Further, existence of counter bits in field 213 will also limit the signature data which may be stored in the field.

In an alternative embodiment of the present invention, "non-final" messages are equipped with a counter which is either incremented or decremented each time the message passes through a node in a signaling network. The counter is altered regardless of the affiliation of the node with a signaling network. In other words, the signature data associated with any particular message is not significant. More particularly, whenever a non-final (that is, a global title routed) signal messaging is created by a node, such as an LNP-GTT system, it inserts a counter in the message. Each subsequent node traversed by the signaling message either increments or decrements the counter if the node sends the message to another non-final destination. If the counter exceeds a maximum number of counts, the message is determined to be a "looping" message and is discarded. In this manner, the signaling messages which traverse a plurality of signaling networks are prevented from continual looping among the signaling networks. This embodiment may be implemented using existing signaling message formats but requires cooperation among service providers which maintain their own signaling networks to agree upon the implementation of the signaling message counter solution.

Advantageously, signaling link resources between signaling networks are used more efficiently. Although this invention has been described with respect to preferred embodiments, those skilled in the art will recognize numerous other arrangements which may be devised without departing from the scope of the claimed invention.

The invention claimed is:

1. In a telecommunications system supporting a plurality of telecommunications service providers, each telecommunications service provider maintaining a separate signaling network interconnected by signaling links, a method for efficiently using signaling link resources interconnecting the signaling networks comprises the steps of:

determining a signaling message must be extended to another signaling network;

including signature data identifying all telecommunications service providers that handled the signaling message, wherein the signature data is not a point code;

a first signaling network extending the message to another signaling network; and the first signaling network subsequently discarding the signaling message upon recognition of the signature data.

2. The method of claim 1 wherein the step of including signature data comprises the step of:

including signaling network identification data of the telecommunications service provider in a called party identification field of a signaling message.

3. The method of claim 2 further comprising the step of:

including signaling network identification data of a telecommunications provider in the signaling message.

4. The method of claim 1 wherein the step of including signature data comprises the step of:

including signature data in an existing field of a signaling message.

5. A local number portability-global title translation (LNP-GTT) system comprises:

processor means for creating signaling messages including signature data identifying a service provider that originated the message, wherein the signature data is not a point code; and storage means for storing the signature data for inclusion in signaling messages formulated by the processor means.

6. The LNP-GTT system of claim 5 wherein the signature data comprises data identifying a telecommunications service provider.

7. The LNP-GTT system of claim 5 further comprising processor means for recognizing signature data and discarding signaling messages upon recognition of the signature data.

8. In a telecommunications system including a signaling network for processing signaling messages, a method of accounting for signaling network resources used during processing of a signaling message comprises the steps of:

receiving the signaling message in a node of the signaling network;

recognizing signature data identifying a service provider that originated the message, the signature data being stored in the signaling message, wherein the signature data is not a point code; and incrementing a counter within the message responsive to recognizing the signature data stored in the message.

9. The method of claim 8 further comprising the step of:

using the counter to determine the number of increments associated with the signaling message.

10. In a telecommunications system supporting a plurality of telecommunications service providers, each telecommunications service provider maintaining a separate signaling network interconnected by signaling links, a method for eliminating continual looping of signaling messages among the signaling networks comprises the steps of:

a first signaling network determining a signaling message must be extended to a second signaling network;

the first signaling network inserting a counter within the signaling message wherein the counter is not based upon a point code;

receiving the signaling message in a node of the second signaling network; and the node in the second signaling network altering the counter included in the signaling message prior to extending the signaling message to another node.

11. The method of claim 10 wherein the step of altering the counter included in the signaling message comprises the step of:

incrementing the counter contained in the signaling message.

12. The method of claim 10 wherein the step of altering the counter included in the signaling message comprises the step of:

decrementing the counter in the signaling message.

13. The method of claim 10 further comprising the step of:

initializing all nodes in signaling networks of the telecommunications system to discard the signaling message after its counter exceeds a predetermined minimum of counts.

* * * * *